Sept. 5, 1967  A. CANDELISE  3,340,520
BATTERY CHARGE INDICATOR
Filed May 14, 1964

INVENTOR.
Alfred Candelise
BY C. R. Meland
His Attorney

United States Patent Office 3,340,520
Patented Sept. 5, 1967

3,340,520
BATTERY CHARGE INDICATOR
Alfred Candelise, Flint, Mich., assignor to General Motors Corporation, Detroit, Mich., a corporation of Delaware
Filed May 14, 1964, Ser. No. 367,295
8 Claims. (Cl. 340—249)

This invention relates to an electrical system for indicating the state of charge of a storage battery.

One of the objects of this invention is to provide a battery charge indicating arrangement which is capable of indicating whether or not a storage battery is dangerously under charged while it is in place on a motor vehicle.

Another object of this invention is to provide a battery charge indicating arrangement which is capable of indicating whether or not a battery has an acceptable charge while the battery is on a motor vehicle by an arrangement which senses starter current and battery voltage simultaneously and uses these signals to control a visual indicating device such as a signal lamp.

Another object of this invention is to provide a battery charge indicating arrangement which includes a relay having two voltage coils that are connected across the battery through an ignition switch and through a starter switch, the magnetic flux developed by the two coil windings of the relay controlling the opening and closing of contacts that control a signal light circuit. In this arrangement, a temperature compensating device such as a bi-metal hinge for the relay armature is provided in order to compensate for changes in the internal resistance of the battery during extreme cold weather.

Further objects and advantages of the present invention will be apparent from the following description, reference being had to the accompanying drawings wherein preferred embodiments of the present invention are clearly shown.

Figure 1:
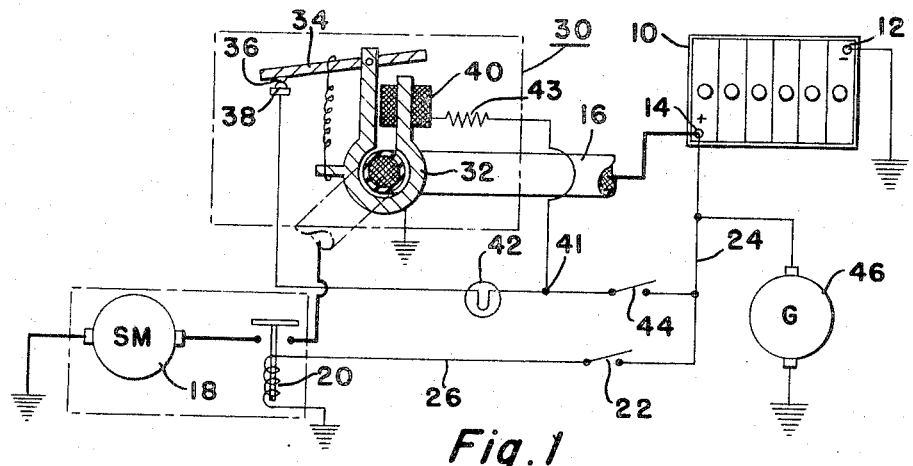
FIGURE 1 is a schematic circuit diagram of a battery charge indicator made in accordance with this invention which uses battery voltage and starter current for controlling a signal lamp circuit.

Referring now to the drawings and more particularly to FIGURE 1, the reference numeral 10 designates a storage battery on a motor vehicle. The negative terminal 12 of the battery 10 is grounded and the positive terminal 14 of the battery is connected with a heavy cable 16 which goes to an electric cranking motor 18.

The electric cranking motor 18 can be of any conventional construction and may include a solenoid 20 for closing the circuit between the battery cable 16 and the positive terminal of the starter 18 when the manually operable starter switch 22 is closed. It is seen that when the starter switch 22 is closed, the solenoid 20 is energized through conductor 24, the starter switch 22 and conductor 26. The conductor 24 is connected with the positive terminal 14 of the battery 10. It will, of course, be appreciated that the coil 20 can be the relay coil of a magnetic switch which would control the starter. Where the coil 20 is a solenoid, it can also be used to shift the pinion of the starter into mesh with the ring gear of the engine all of which is well known to those skilled in the art.

The indicating system of FIGURE 1 uses a relay generally designated by reference numeral 30. This relay has a frame 32 which is formed of magnetic material. The frame 32 pivotally supports an armature 34 carrying a contact 36 which cooperates with a fixed contact 38.

A voltage coil 40 is provided which can generate magnetic flux that flows through the frame 32 and through the armature 34 of the relay when it is energized. It is seen that the battery cable 16 passes through the frame 32 of the relay. The current flowing from the battery 10 to starter 18 through the cable 16 therefore produces a magnetic flux in the frame 32 of the relay which aids the flux generated by the voltage coil 40.

One side of coil 40 is connected to junction 41 through thermistor 43. The opposite side of coil 40 is grounded to the frame 32.

The fixed contact 38 of the relay 30 is connected with a signal lamp 42, the opposite side of the signal lamp being connected with an ignition switch 44 and junction 41. The opposite side of the ignition switch 44 is connected with conductor 24 coming from the positive side of the battery 10.

The battery 10 receives charging current from a generator designated by reference numeral 46.

The system of FIGURE 1 which has just been described is capable of indicating to the driver of a motor vehicle whether or not the charge of his battery is above an acceptable level. When the ignition switch 44 is closed prior to cranking the engine, the signal lamp 42 will be lighted through a circuit that includes the grounded frame 32 of the relay. When the starter switch 22 is closed, the starter 18 will be energized and the engine will be cranked. The magnetic flux which now attempts to separate contacts 36 and 38 will be proportional to the voltage appearing between conductor 24 and ground as sensed by the voltage coil 40 and will be proportional to the amount of current being supplied to the starter motor through the cable 16.

If the battery is charged sufficiently, the additive magnetic flux of the voltage current and the starter coil will be sufficient to cause the armature 34 to pull in and the contacts 36 and 38 will separate. This turns off the signal lamp 42 indicating to the driver that his battery is sufficiently charged. Once the relay 30 pulls in to separate contacts 36 and 38, it can be held in its pulled in condition by the system voltage appearing between conductor 24 and ground. Thus after the engine starts, the voltage appearing between conductor 24 and ground will be in the neighborhood of 12 to 16 volts due to the charging effect of the generator 26 and this voltage is sufficient to hold the armature 34 in a position where the contacts 36 and 38 are separated.

If the battery is under charged, the combined effect of starter current and battery voltage will not be sufficient to pull in the relay 30 and the contacts 36 and 38 will remain engaged to cause the lamp 32 to remain lighted. When the cranking effort is terminated and the engine starts, the light will continue to stay on because the 12 to 16 volts available is not enough to effect pull in of the relay 30.

The thermistor 43 compensates for resistance variation caused by extreme cold weather. This compensation could also be achieved by providing a relay that has a bi-metal spring hanger.

Figure 2:
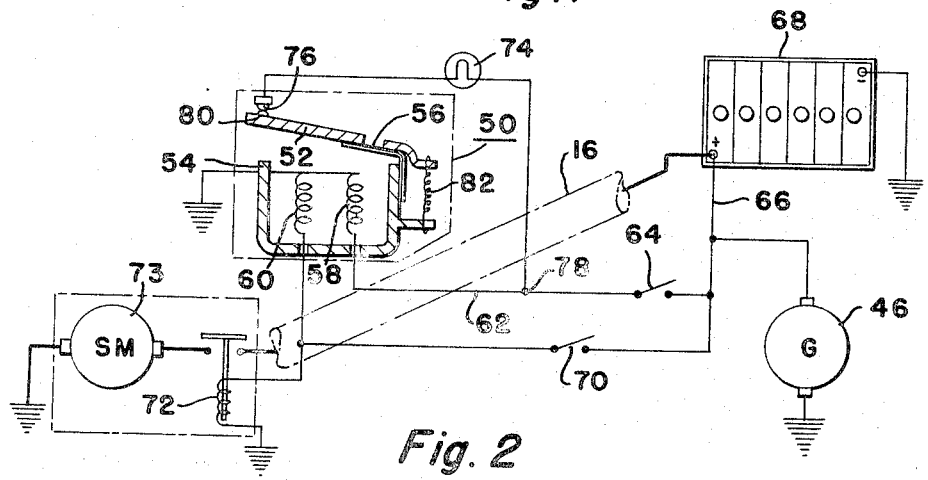
FIGURE 2 is a schematic circuit diagram of a battery charge indicator which uses a relay having two coils that sense battery voltage through an ignition switch and a starter switch.

Referring now to FIGURE 2, a battery charge indicating system is illustrated which is suitable for applications where the effect of starter current can be neglected. In the system of FIGURE 2, a relay 50 is provided which has an armature 52 connected to a frame 54 by a bi-metal hinge 56. The relay 50 has two voltage coils 58 and 60 which are connected to the grounded frame 54.

One side of the voltage coil 58 is connected with conductor 62 which is connected to one side of an ignition switch 64. The opposite side of the ignition switch 64 is connected with conductor 66 which is in turn connected to one side of the storage battery 68. A starter switch 70 controls the energization of a coil 72 which controls the energization of the cranking motor 73 in the same manner as coil 20 of FIGURE 1. The starter switch 70 also feeds the voltage coil 60. A signal lamp 74, which can be mounted on a dashboard of a motor vehicle, is connected between a fixed contact 76 of the relay and junction 78. The movable contact 80 of the relay 50 is carried by the armature 52.

In the system of FIGURE 2, the voltage coils 58 and 60 have the same number of turns of wire and when these coils are sufficiently energized, the armature 52 is moved toward the frame 54 and the contacts 76 and 80 open. In a 12 volt motor vehicle electrical system, the arrangement can be such that the contacts 76 and 80 are separated when the voltage appearing between conductor 66 and ground is above 9.5 volts. The combined effect of voltage coils 58 and 60 is to provide a pull which is equivalent to 19 volts and the relay 50 is therefore arranged so that a combined pull of 19 volts is required to open the contacts 76 and 80 against the force of the spring 82. If the battery is sufficiently charged and the ignition and starter switches are closed, the combined pull developed by coils 58 and 60 will be sufficient to pull in the relay 50 opening contacts 76 and 80 and deenergizing the lamp 74. When starter switch 70 is opened as when the engine starts, the system voltage appearing between conductor 66 and ground will be 12 to 16 volts and is high enough to hold in the relay 50 and therefore maintain the lamp 74 deenergized.

When the engine stops running, the relay 50 is deenergized and the contacts 76 and 80 become engaged and the relay is ready for the next engine start.

If the battery is not charged sufficiently, the combined pull of coils 58 and 60 will not be sufficient to separate contacts 76 and 80 when one is attempting to crank the engine and this will indicate to the driver that his battery is not up to an acceptable charge level. When the engine starts, the light will continue to stay on because the 12 to 16 volts available is not sufficient to pull in the relay 50 even though it is sufficient to hold it in once it has been pulled in.

The bi-metal hinge 56 is used as a temperature compensating device which reduces the amount of magnetic pull required to pull in the relay 50 as the ambient temperature decreases. This bi-metal hinge is required during extreme cold weather but operates at all temperatures to vary the force required to pull in the relay 50.

Figure 3:
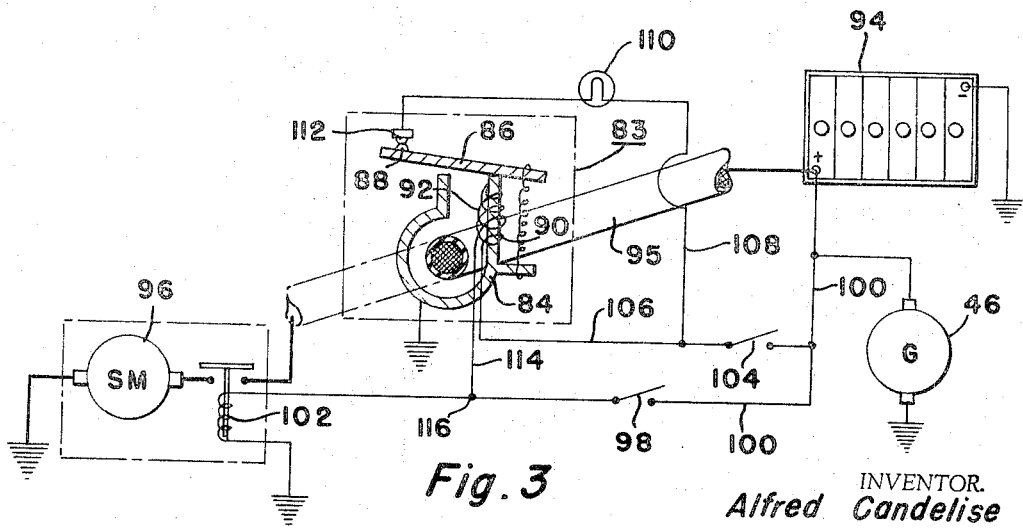
FIGURE 3 illustrates a battery charge indicator system which senses starter current and has two voltage coils for sensing battery voltage.

Referring now to FIGURE 3, a system is illustrated which uses some of the features of the systems illustrated in FIGURES 1 and 2. In FIGURE 3, the relay is generally designated by reference numeral 83 and includes a frame 84 which pivotally supports an armature 86 carrying a movable contact 88. The frame 84 is grounded and two voltage coils 90 and 92 are wound on one leg of the frame 84. These voltage coils have the same number of turns.

The cable 95 connecting the battery 94 and the starter 96 passes through the frame 84 in the same manner as is illustrated in the system of FIGURE 1. The magnetic flux developed in the frame 84 therefore is a function of starter current and system voltage.

The starter switch 98 is connected between conductor 100 and a solenoid or coil 102 which is capable of controlling contacts for connecting the cable 95 with the starter 96. The ignition switch 104 is connected between conductor 100 and conductors 106 and 108. The conductor 108 is connected with one side of signal lamp 110, the opposite side of the lamp going to the fixed contact 112 of the relay 82. The conductor 106 is connected to one side of the voltage coil 90. A conductor 114 connects one side of the voltage coil 92 with junction 116.

When the ignition switch and the starter switch in FIGURE 3 are closed, the voltage coils 90 and 92 will be energized and the starter 96 will be energized. The combined magnetic effect of voltage coils 90 and 92 and starter current will attempt to pull in the relay 82 to separate contacts 88 and 112. If the battery 94 is sufficiently charged, the relay 82 will pull in to separate contacts 88 and 112 and the lamp 110 will be extinguished indicating that the battery is charged to an acceptable level. If the battery is not charged to an acceptable level, the relay 82 will not pull in and the lamp 110 will remain energized indicating that the battery is charged to a level which is not acceptable.

In the system of FIGURE 3, the number of turns for the voltage coils 90 and 92 is equal in number to the total number of turns of the voltage coil 40 illustrated in FIGURE 1.

While the embodiments of the present invention as herein disclosed constitute a preferred form, it is to be understood that other forms might be adopted.

What is claimed is as follows:

1. A battery charge indicating system for use on a motor vehicle comprising, a relay having an actuating coil and a shiftable armature, an ignition switch, a starter switch, an electric cranking motor for cranking the engine of said motor vehicle, a conductor connecting said battery and said electric cranking motor, said conductor being located in flux transfer relationship with said relay, whereby said relay responds to the combined flux developed by said actuating coil and said conductor means connecting the actuating coil of said relay in series with said battery through said ignition switch, and a signal lamp connected with said ignition switch and relay contacts, said signal lamp being deenergized when the charge of said battery is above a predetermined level as determined by starter current and battery voltage.

2. A battery charge indicating system for a motor vehicle comprising, an electric starting motor, a relay having a shiftable armature, switch contacts and an actuating coil, means connecting the actuating coil across said battery whereby said actuating coil responds to battery voltage, a cable connecting said battery and electric starting motor, said cable being located in such a position that current flow through said cable provides a magnetic flux for said relay which aids the flux generated by said actuating coil when said starting motor is energized by said battery, and an electrically energizable signal means controlled by said relay contacts.

3. The battery charge indicating system according to claim 2 wherein the relay coil is comprised of two windings connected in parallel across the battery.

4. A battery charge indicating system for a motor vehicle comprising a battery, an electric cranking motor, an ignition switch, a starting switch, a relay having first and second actuating coils, switch contacts and a movable armature, means connecting one of said relay coils with said battery through said ignition switch, means connecting the other of said relay coils with said battery through said starter switch, and an electrically energizable signal means controlled by said relay contacts, said relay being so constructed and arranged that it is actuated when the battery voltage as sensed by said first and second relay coils is above a predetermined value during the time that said electric cranking motor is energized, said relay being held in its actuated position by said relay coil that is connected with said ignition switch when said starter switch is opened to terminate energization of said electric cranking motor.

5. A battery charge indicating system for a motor vehicle comprising, a battery, an electric starting motor for cranking the engine of the vehicle, an ignition switch, a starter switch, a relay having an actuating coil and switch contacts, a signal lamp, a circuit for energizing said signal lamp from said battery including said relay switch contacts and said ignition switch, a cable connecting said battery and said electric starting motor, said cable being located in flux transfer relationship with said relay, whereby said relay responds to the combined flux developed by said actuating coil and said conductor, means connecting said starter switch in controlling relationship with said starting motor, and means for connecting said relay actuating coil across said battery including said ignition switch.

6. A battery charge indicating system for indicating the state of charge of a storage battery on a motor vehicle when said battery is energizing an electric cranking motor comprising, a cable, said cable supplying current to said electric cranking motor when said battery and cranking motor are connected, a relay having a voltage responsive coil and switch contacts, means connecting said voltage responsive coil across said battery when said battery is supplying current to said cranking motor, said relay having a magnetic part located in flux transfer relationship with said cable that connects said battery and starting motor whereby said relay is controlled as a function of battery voltage and starting motor current when said starting motor is energized by said battery, and an electrically energizable indicating device connected with the switch contacts of said relay and said battery, said indicating device being energized when battery voltage and starting current are below predetermined levels.

7. The battery charge indicating system according to claim 6 where a temperature responsive resistor is connected in series with the voltage coil of the relay to provide temperature compensation for the system.

8. The battery charge indicating system according to claim 4 where said relay has an armature and where said armature is pivoted to a fixed part of the relay by a bi-metallic part that provides temperature compensation.

References Cited
UNITED STATES PATENTS

| | | | |
|---|---|---|---|
| 1,981,880 | 11/1934 | Sayre | 290—38 |
| 1,993,444 | 3/1935 | Haskins | 324—29.5 |
| 3,253,215 | 5/1966 | Moakler et al. | 340—253 X |

NEIL C. READ, *Primary Examiner.*

D. MYER, *Assistant Examiner.*